US012777280B2

(12) United States Patent
Aga et al.

(10) Patent No.: US 12,777,280 B2
(45) Date of Patent: Oct. 27, 2026

(54) SUPPRESSION OF NOISE CAUSED BY SWITCHING OF AUDIO SOURCE

(71) Applicant: TOYOTA JIDOSHA KABUSHIKI KAISHA, Aichi-ken (JP)

(72) Inventors: Toshiyuki Aga, Tokyo-to (JP); Hideto Kimura, Kobe (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 120 days.

(21) Appl. No.: 18/621,109

(22) Filed: Mar. 29, 2024

(65) Prior Publication Data

US 2025/0310685 A1 Oct. 2, 2025

(51) Int. Cl.
*H04R 3/02* (2006.01)
*G06F 3/16* (2006.01)

(52) U.S. Cl.
CPC ............... *H04R 3/02* (2013.01); *G06F 3/162* (2013.01); *H04R 2430/01* (2013.01)

(58) Field of Classification Search
CPC ........ H04R 3/02; H04R 2430/01; G06F 3/162
See application file for complete search history.

(56) References Cited

U.S. PATENT DOCUMENTS 5,703,794 A * 12/1997 Heddle ................... G06F 3/165 370/522
6,983,464 B1 * 1/2006 Bhattacharya ....... H04N 21/443 348/E5.006
2005/0080500 A1 * 4/2005 Kimura ............ G11B 20/10527 381/104
2007/0171788 A1 7/2007 Yokoyama et al.
2012/0196583 A1 * 8/2012 Kindo ................. H04M 1/6091 455/420
2013/0093958 A1 4/2013 Yoshikawa
2013/0215332 A1 8/2013 Matsumoto et al.
2014/0029771 A1 * 1/2014 Muench ................... H04R 3/00 381/123
2016/0212254 A1 * 7/2016 Akama ............... H04M 1/6091
2018/0088897 A1 * 3/2018 Mathur ................... G06F 3/165

FOREIGN PATENT DOCUMENTS

JP 2013-083607 A 5/2013
WO 2022/202124 A1 9/2022

* cited by examiner

*Primary Examiner* — Daniel R Sellers
(74) *Attorney, Agent, or Firm* — HAUPTMAN HAM, LLP

(57) ABSTRACT

Suppression of noise caused by switching of audio source is performed by receiving, while a speaker outputs audio from a first application, an instruction to output audio from a second application, muting audio output from the speaker in response to receiving the instruction, instructing an amplifier in communication with the speaker to associate a second channel with the second application, instructing the first application to deactivate audio transmission, instructing the amplifier to switch a speaker input from a first channel associated with the first application to the second channel, instructing the second application to activate audio transmission, and unmuting the audio output from the speaker.

17 Claims, 4 Drawing Sheets

SUPPRESSION OF NOISE CAUSED BY SWITCHING OF AUDIO SOURCE

BACKGROUND

An audio output device installed in a vehicle, such as a speaker or speaker system, is used by a plurality of applications. Some applications are non-flutter applications, which produce constant audio streams from radio, prerecorded physical media, internet, etc. Some applications are flutter applications, which produce intermittent audio data for navigation, warnings, etc. At any given time, more than one application may be producing audio for output by the output device. At certain times, the sound emitted from the audio output device is changed from one application to another application.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
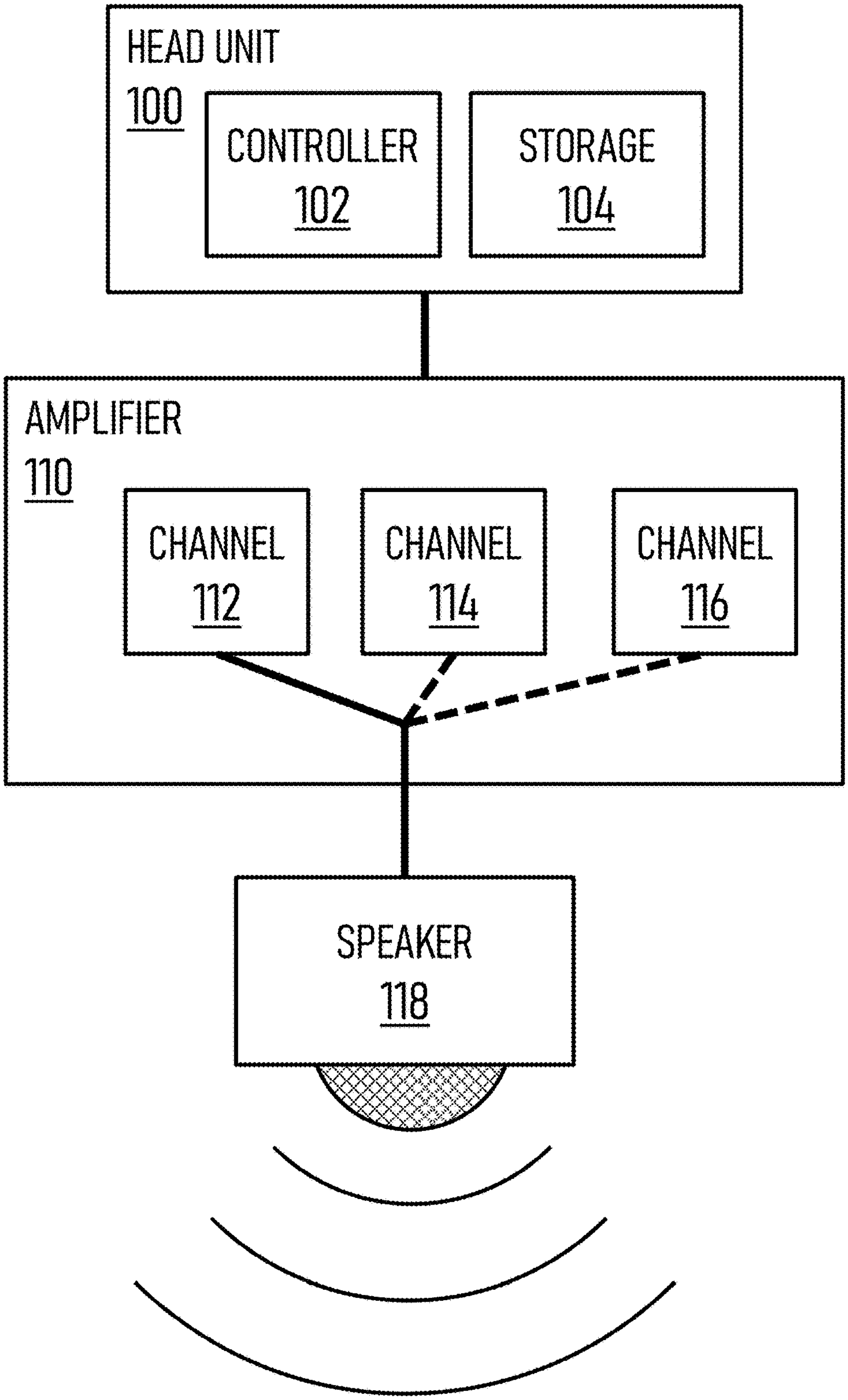
FIG. 1 is a schematic diagram of a system for suppression of noise caused by switching of audio source, according to at least some embodiments of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In some instances where the sound emitted from an audio output device is changed from one application to another application, digital noise is generated. In some cases, the noise is caused by a current application continuing output after the bitrate or other property of audio output has changed. For example, if a navigation application tries to deliver a reminder to turn right over the sound of a radio application, the navigation application voice becomes misunderstandable.

In at least some embodiments described herein, an application manager mutes audio output in response to receiving an instruction to switch the active audio application, communicates with the current application and the new application to implement the switch, and then unmutes the audio output.

In at least some embodiments, performance by an application manager provides low latency noise suppression caused by audio source switching. In at least some embodiments, the head unit only requires less than a second to perform noise suppression caused by audio source switching, which reduces the required capacity of a buffer of an audio channel on the amplifier, which is commonly less than one second. In at least some embodiments, performance by a head unit is faster than many amplifiers, especially those which do not have sufficient computational resources to perform noise suppression caused by audio source switching without exceeding a buffer limit.

In at least some embodiments, the head unit instructs the amplifier to reserve the second channel, by associating the second channel with the second application, before instructing the first application to deactivate audio production so that the amplifier does not detect an error. In at least some embodiments, reserving the second channel before instructing the first application to deactivate audio production also allows the amplifier time to set aside resources, such as a channel buffer, and establish any permissions for the second application while the head unit communicates with the applications.

FIG. 1 is a schematic diagram of a system for suppression of noise caused by switching of audio source, according to at least some embodiments of the present invention. The system includes a head unit 101, an amplifier 110, and a speaker 118.

Head unit 101 is in communication with amplifier 110. Head unit 101 includes a controller 102 and a storage 104. In at least some embodiments, head unit 100 utilizes controller 102 and storage 104 to execute an application manager. In at least some embodiments, head unit 100 utilizes controller 102 and storage 104 to further execute a first application and a second application. In at least some embodiments, head unit 100 is an in-dash media device for a vehicle. In at least some embodiments, head unit 100 issues commands to amplifier 110 to "mute", "change channel", etc. In at least some embodiments, head unit 100 utilizes channel identifiers. In at least some embodiments, head unit 100 is in communication with other vehicle devices, such as Electronic Control Units (ECU), through a network, such as a Controller Area Network (CAN), Ethernet, or other wireless or wired network. In at least some embodiments, head unit 100 is in communication with an ECU executing an arbitration manager. In at least some embodiments, controller 102 is a processor, such as an ECU, or programmable circuitry executing instructions to cause the processor or programmable circuitry to perform operations according to the instructions, such as to execute the application manager, the first application, and the second application. In at least some embodiments, storage 104 is a volatile or non-volatile computer-readable medium capable of storing executable and non-executable data for access by controller 102 during execution of the instructions.

Amplifier 110 is in communication with head unit 100 and speaker 118. Amplifier 110 includes a channel 112, a channel 114, and a channel 116. In at least some embodiments, amplifier 110 outputs an audio signal to speaker 118. In at least some embodiments, each of channel 112, channel 114, and channel 116 is configured to route audio data from an application to speaker 118. In at least some embodiments, each of channel 112, channel 114, and channel 116 is associated with a path identifier, such as "radio", "media player", etc. In at least some embodiments, each of channel 112, channel 114, and channel 116 has a preconfigured audio bitrate, sampling rate, buffer size, equalizer levels, etc. In at least some embodiments, each of channel 112, channel 114, and channel 116 are configured at the time of association with the path identifier. In at least some embodiments, each of channel 112, channel 114, and channel 116 are configured and associated with a path identifier by head unit 100. In at least some embodiments, amplifier 110 is configured to increase amplitude of an audio signal before transmitting the audio signal to speaker 118. In at least some embodiments, amplifier 110 is configured to convert audio data received from head unit 110 to the audio signal before amplifying the audio signal. In at least some embodiments, amplifier 110 receives instructions and audio transmissions through a digital interface.

Speaker 118 is in communication with amplifier 118. In at least some embodiments, speaker 118 receives an audio signal from amplifier 110. In at least some embodiments, speaker 118 is a transducer configured to convert an electric signal to a compression wave. In at least some embodiments, speaker 118 includes more than one transducer. In at least some embodiments, speaker 118 includes more than one speaker, such as left and right speakers, front and rear speakers, etc.

Figure 2:
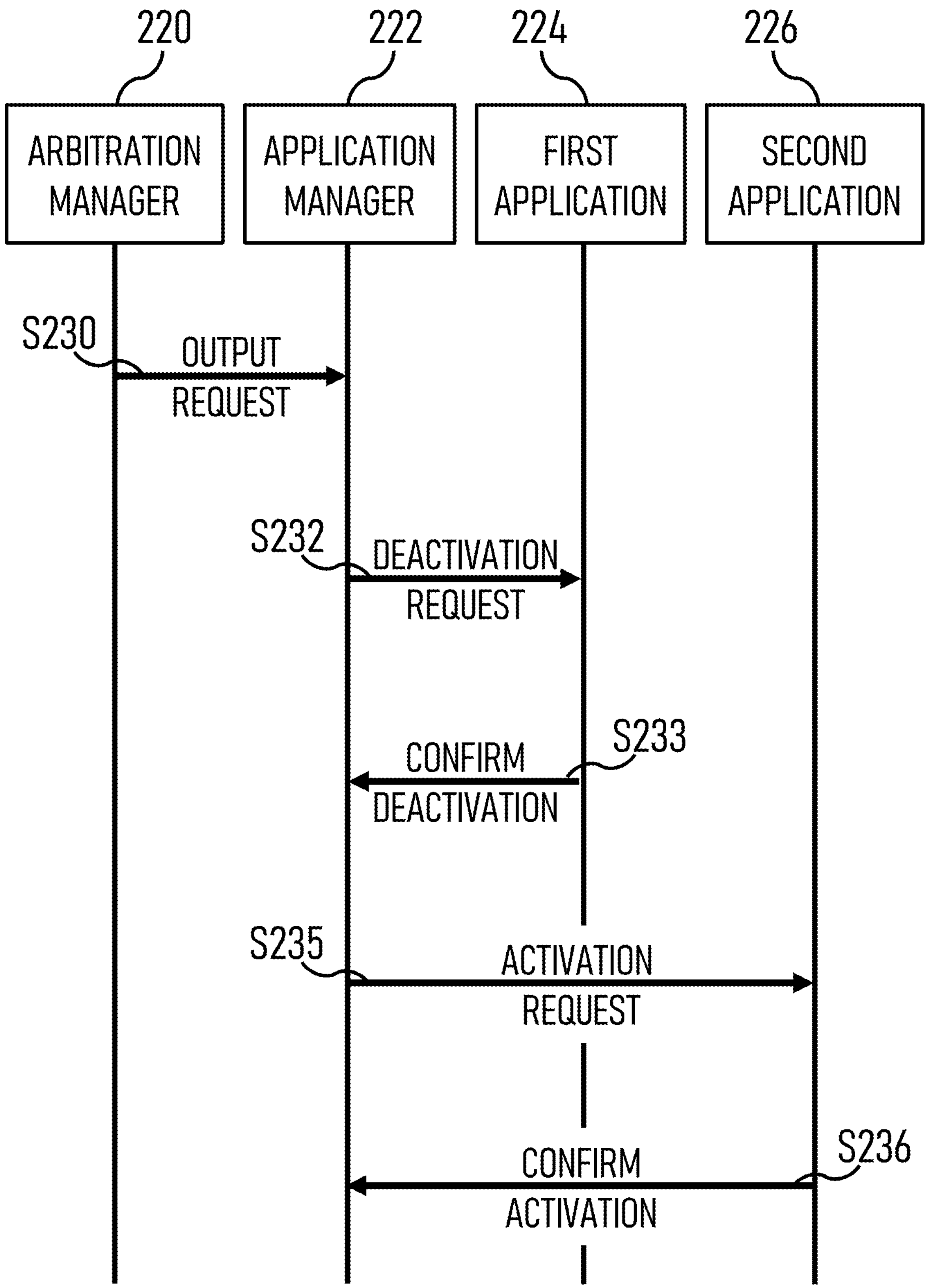
FIG. 2 is a schematic diagram of a head unit for suppression of noise caused by switching of audio source, according to at least some embodiments of the present invention.

FIG. 2 is an informational flow for suppression of noise caused by switching of audio source, according to at least some embodiments of the present invention. The informational flow is among an arbitration manager 220, an application manager 222, a first application 224, and a second application 226.

In at least some embodiments, arbitration manager 220 is configured to determine audio priority among applications executed in a vehicle. In at least some embodiments, application manager 222 is configured to facilitate and switch audio output from applications executed in the vehicle. In at least some embodiments, first application 224 is a non-flutter application configured to produce audio data from a musical source, such as radio, prerecorded physical media, internet, etc. In at least some embodiments, first application 226 is a flutter application configured to produce intermittent audio data for navigation, warnings, etc. In at least some embodiments, first application 224 and second application 226 are any combination of flutter applications and non-flutter applications. In at least some embodiments, first application 224 and second application 226 are flutter applications. In at least some embodiments, first application 224 and second application 226 are non-flutter applications. In at least some embodiments, application manager 222, first application 224, and second application 226 are executed by an ECU of a head unit, such as controller 102 of head unit 100 of FIG. 1. In at least some embodiments, arbitration manager 220 is executed by an ECU in communication with the ECU of the head unit. In at least some embodiments, the ECU of the head unit is in communication with the ECU executing arbitration manager 220 through a CAN.

Prior to the informational flow of FIG. 2, application manager 222 has already set a first channel of the amplifier to first application 224 via the path identifier.

At S230, arbitration manager 220 transmits an output request to application manager 222. In at least some embodiments, arbitration manager transmits, to application manager 220 while a speaker outputs audio from a first application, an instruction to output audio from a second application. In at least some embodiments, arbitration manager 220 transmits the output request in response to determining that second application 226 has priority over first application 224. In at least some embodiments, arbitration manager 220 transmits the output request in response to determining that second application 226 has absolute priority.

At S232, application manager 222 transmits a deactivation request to first application 224. In at least some embodiments, application manager 220 instructs first application 224 to deactivate audio transmission. In at least some embodiments, application manager 220 transmits the deactivation request in response to muting audio output.

At S233, first application 224 transmits a deactivation confirmation to application manager 222. In at least some embodiments, first application 224 acknowledges the deactivation request. In at least some embodiments, first application 224 transmits the deactivation confirmation in response to deactivating audio transmission to an amplifier.

At S235, application manager 222 transmits an activation request to second application 226. In at least some embodiments, application manager 220 instructs the second application to activate audio transmission. In at least some embodiments, application manager 220 transmits the activation request in response to switching input to a speaker. In at least some embodiments, second application 226 will not produce audio unless and until instructed by application manager 222.

At S236, second application 226 transmits an activation confirmation to application manager 222. In at least some embodiments, second application 226 acknowledges the activation request. In at least some embodiments, second application 226 transmits the activation confirmation in response to activating audio transmission to an amplifier.

Figure 3:
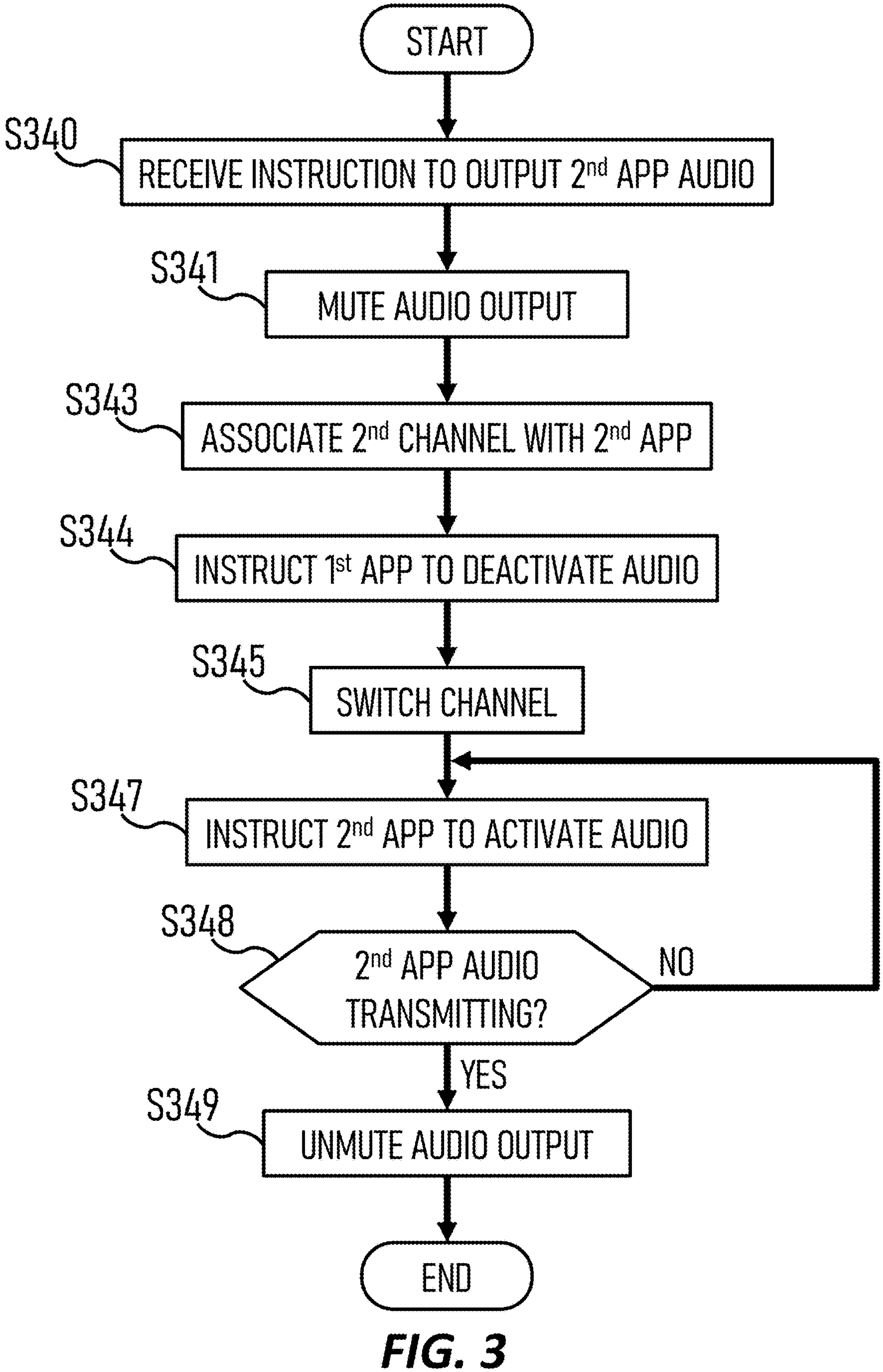
FIG. 3 is an operational flow for suppression of noise caused by switching of audio source, according to at least some embodiments of the present invention.

FIG. 3 is an operational flow for suppression of noise caused by switching of audio source, according to at least some embodiments of the present invention. The operational flow provides a method of suppression of noise caused by switching of audio source. In at least some embodiments, the method is performed by a controller of a head unit, such as controller 102 of FIG. 1 or controller 402 of FIG. 4.

At S340, the controller or a section thereof receives an instruction to output audio from a second application. In at least some embodiments, the controller receives, while a speaker outputs audio from a first application, an instruction to output audio from a second application. In at least some embodiments, the controller receives the instruction from an arbitration manager. In at least some embodiments, the controller receives the instruction from an ECU through a CAN. In at least some embodiments, the instruction identifies the first application. In at least some embodiments, the operational flow is triggered when the controller receives an instruction from an arbitration manager to switch audio from the first application to the second application.

At S341, the controller or a muting section thereof mutes audio output. In at least some embodiments, the controller mutes audio output in response to receiving the instruction. In at least some embodiments, the controller suppresses audio transmission from the first application. In at least some embodiments, the controller suppresses audio transmission to the amplifier. In at least some embodiments, the controller instructs the amplifier to set a speaker volume to zero. In at least some embodiments, muting audio output includes at least one of suppressing audio transmission from the first application, suppressing audio transmission to the amplifier, or instructing the amplifier to set a speaker volume to zero.

At S343, the controller or an associating section thereof associates a second channel with the second application. In at least some embodiments, the controller instructs an amplifier in communication with the speaker to associate a second channel with the second application. In at least some embodiments, the second channel has at least one of an audio bitrate, sampling rate, buffer size, or equalizer setting corresponding to the second application. In at least some embodiments, the controller instructs the amplifier to adjust at least one of an audio bitrate, sampling rate, buffer size, or equalizer setting to a predetermined level. In at least some embodiments, the instruction includes an identifier of the second application, and a predetermined level of each of at least one of an audio bitrate, sampling rate, buffer size, or equalizer setting. In at least some embodiments, the second channel is reserved, but not selected for output to the speaker.

At S344, the controller or an instructing section thereof instructs a first application to deactivate audio transmission. In at least some embodiments, the controller instructs the first application to deactivate audio transmission. In at least some embodiments, the controller instructs the first application to deactivate audio transmission after instructing the amplifier to associate the second channel with the second application. In at least some embodiments, the controller transmits a deactivation request, such as deactivation request S232 of FIG. 2.

At S345, the controller or a switching section thereof switches to the second channel. In at least some embodiments, the controller instructs the amplifier to switch a speaker input from a first channel associated with the first application to the second channel. In at least some embodiments, the instruction identifies the second channel.

At S347, the controller or an instructing section thereof instructs the second application to activate audio transmission. In at least some embodiments, the controller instructs the second application to activate audio transmission. In at least some embodiments, the controller instructs the second application to activate audio transmission after instructing the amplifier to switch to the second channel. In at least some embodiments, the controller transmits an activation request, such as activation request S235 of FIG. 2.

At S348, the controller or a section thereof determines whether the second application is transmitting audio data. In at least some embodiments, the controller detects whether audio data is being transmitted to the amplifier. In at least some embodiments, the controller determines whether the second application has queued audio data bound for the amplifier. In response to the controller determining that the second application is transmitting audio data, the operational flow proceeds to unmuting at S349. In response to the controller determining that the second application is not transmitting audio data, the operational flow returns to audio activation instructing at S347.

At S349, the controller or an unmuting section thereof unmutes the audio output. In at least some embodiments, the controller unmutes the audio output. In at least some embodiments, the unmuting is performed in response to determining that the second application is transmitting audio data.

Figure 4:
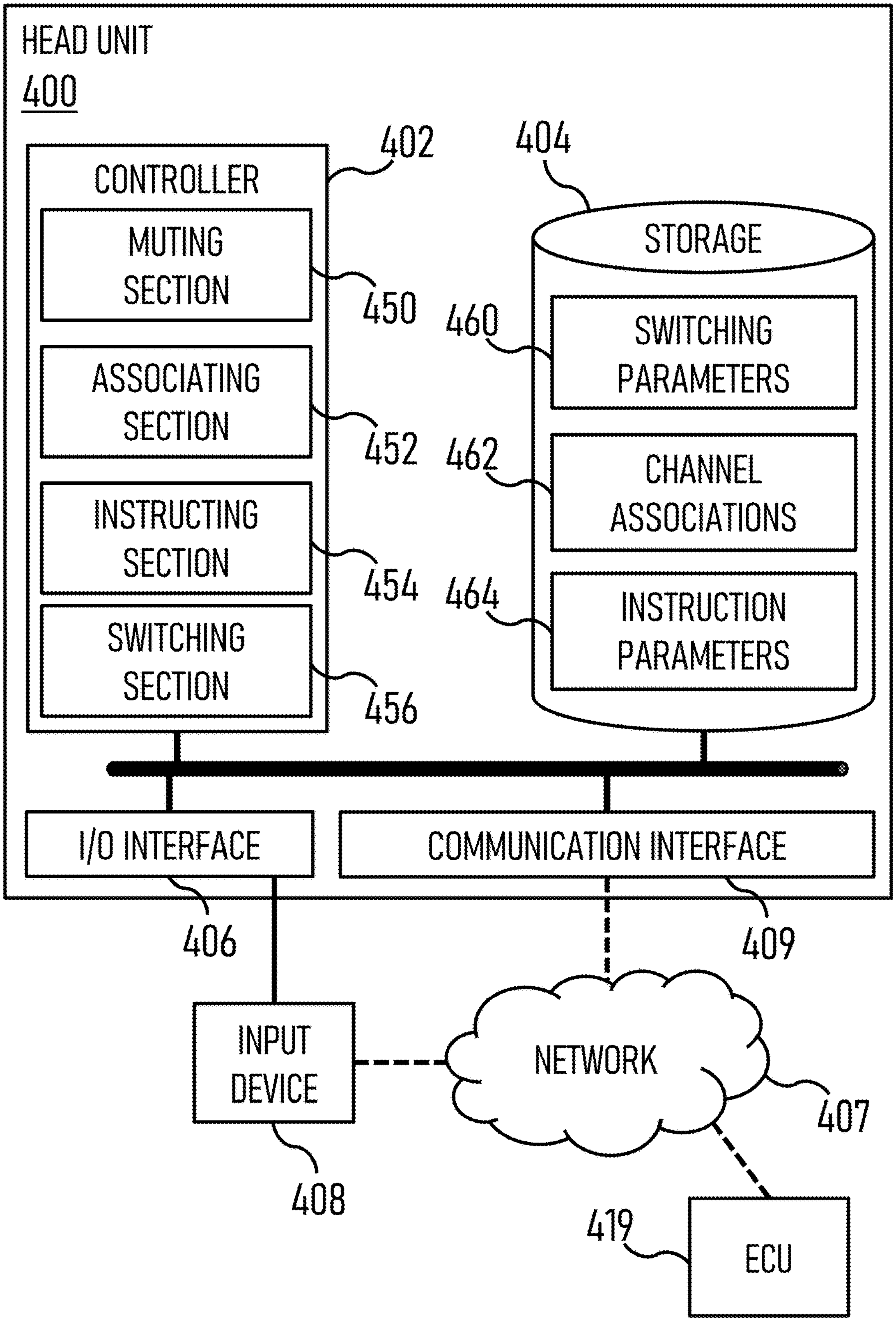
FIG. 4 is a block diagram of a hardware configuration for suppression of noise caused by switching of audio source, according to at least some embodiments of the present invention.

FIG. 4 is a block diagram of a hardware configuration for suppression of noise caused by switching of audio source, according to at least some embodiments of the present invention.

The exemplary hardware configuration includes head unit 400, which interacts with input device 408 directly or through network 407 and interacts with ECU 419 through network 407. In at least some embodiments, head unit 400 is a computer or other computing device that receives input or commands from input device 408. In at least some embodiments, head unit 400 is integrated with input device 408. In at least some embodiments, head unit 400 is a computer system that executes computer-readable instructions to perform operations for suppression of noise caused by switching of audio source.

Head unit 400 includes a controller 402, a storage unit 404, an input/output interface 406, and a communication interface 409. In at least some embodiments, controller 402 includes a processor or programmable circuitry executing instructions to cause the processor or programmable circuitry to perform operations according to the instructions. In at least some embodiments, controller 402 includes analog or digital programmable circuitry, or any combination thereof. In at least some embodiments, controller 402 includes physically separated storage or circuitry that interacts through communication. In at least some embodiments, storage unit 404 includes a non-volatile computer-readable medium capable of storing executable and non-executable data for access by controller 402 during execution of the instructions. Communication interface 409 transmits and receives data from network 407. Input/output interface 406 connects to various input and output units, such as input device 408, via a parallel port, a serial port, a keyboard port, a mouse port, a monitor port, and the like to accept commands and present information. In some embodiments, storage unit 404 is external from head unit 400.

Controller 402 includes muting section 450, associating section 452, instructing section 454, and switching section 456. Storage unit 404 includes switching parameters 460, channel associations 462, and instruction parameters 464.

Muting section 450 is the circuitry or instructions of controller 402 configured to mute audio output. In at least some embodiments, muting section 450 is configured to mute audio output in response to receiving the instruction. In at least some embodiments, muting section 450 utilizes information in storage unit 404, such as channel associations 462. In at least some embodiments, muting section 450 includes sub-sections for performing additional functions, as described in the foregoing flow charts. In at least some embodiments, such sub-sections are referred to by a name associated with a corresponding function.

Associating section 452 is the circuitry or instructions of controller 402 configured to associate channels. In at least some embodiments, associating section 452 is configured to instruct an amplifier in communication with the speaker to associate a second channel with the second application. In at least some embodiments, associating section 452 utilizes information in storage unit 404, such as channel associations 462 and instruction parameters 464. In at least some embodiments, associating section 452 includes sub-sections for performing additional functions, as described in the foregoing flow charts. In at least some embodiments, such sub-sections are referred to by a name associated with a corresponding function.

Instructing section 454 is the circuitry or instructions of controller 402 configured to issue instructions. In at least some embodiments, instructing section 454 is configured to instruct the first application to deactivate audio transmission and instruct the second application to activate audio transmission. In at least some embodiments, associating section 452 utilizes information in storage unit 404, such as instruction parameters 464. In at least some embodiments, instructing section 454 includes sub-sections for performing additional functions, as described in the foregoing flow charts. In at least some embodiments, such sub-sections are referred to by a name associated with a corresponding function.

Switching section 456 is the circuitry or instructions of controller 402 configured to switch audio channels. In at least some embodiments, switching section 456 is configured to instruct the amplifier to switch a speaker input from a first channel associated with the first application to the second channel. In at least some embodiments, switching section 456 utilizes information in storage unit 404, such as switching parameters 460. In at least some embodiments, instructing section 454 includes sub-sections for performing additional functions, as described in the foregoing flow charts. In at least some embodiments, such sub-sections are referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, suppression of noise caused by switching of audio source is performed by receiving, while a speaker outputs audio from a first application, an instruction to output audio from a second application, muting audio output from the speaker in response to receiving the instruction, instructing an amplifier in communication with the speaker to associate a second channel with the second application, instructing the first application to deactivate audio transmission, instructing the amplifier to switch a speaker input from a first channel associated with the first application to the second channel, instructing the second application to activate audio transmission, and unmuting the audio output from the speaker. In at least some embodiments, muting the audio output from the speaker includes at least one of suppressing audio transmission from the first application, suppressing audio transmission to the amplifier, or instructing the amplifier to set a speaker volume to zero. In at least some embodiments, the instructing the first application to deactivate audio transmission is performed after the instructing the amplifier to associate the second channel with the second application. In at least some embodiments, the unmuting is performed in response to determining that the second application is transmitting audio data. In at least some embodiments, the first application and the second application are any combination of flutter applications and non-flutter applications. In at least some embodiments, the amplifier receives instructions and audio transmissions through a digital interface. In at least some embodiments, the second channel has at least one of an audio bitrate, sampling rate, buffer size, or equalizer setting corresponding to the second application.

In at least some embodiments, suppression of noise caused by switching of audio source is performed by a processor executing instructions in accordance with the foregoing operations or a device comprising a controller including circuitry configured to perform the foregoing operations.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. A non-transitory computer-readable medium storing instructions that, when executed by one or more processors, cause the one or more processors to performs operations comprising:

receiving, while a speaker outputs audio from a first application, an instruction to output audio from a second application;

muting audio output from the speaker in response to receiving the instruction;

instructing an amplifier in communication with the speaker to associate a second channel with the second application;

instructing the first application to deactivate audio transmission;

instructing the amplifier to switch a speaker input from a first channel associated with the first application to the second channel after instructing the first application to deactivate audio transmission;

instructing the second application to activate audio transmission; and unmuting the audio output from the speaker, in response to confirming that the second application is transmitting audio data.

2. The computer-readable medium of claim 1, wherein the muting the audio output from the speaker includes at least one of suppressing audio transmission from the first application, suppressing audio transmission to the amplifier, or instructing the amplifier to set a speaker volume to zero.

3. The computer-readable medium of claim 1, wherein the instructing the first application to deactivate audio transmission is performed after the instructing the amplifier to associate the second channel with the second application.

4. The computer-readable medium of claim 1, wherein the first application and the second application are any combination of flutter applications and non-flutter applications.

5. The computer-readable medium of claim 1, wherein the amplifier receives instructions and audio transmissions through a digital interface.

6. The computer-readable medium of claim 1, wherein the instruction to output audio from the second application is received from an arbitration manager in response to the arbitration manager determining that the second application has priority over the first application.

7. The computer-readable medium of claim 1, wherein the second channel differs from the first channel in at least one of an audio bitrate, sampling rate, or buffer size.

8. The computer-readable medium of claim 1, wherein the amplifier is instructed to switch in response to confirming that the first application is not transmitting audio data.

9. A method comprising:

receiving, while a speaker outputs audio from a first application, an instruction to output audio from a second application;

muting audio output from the speaker in response to receiving the instruction;

instructing an amplifier in communication with the speaker to associate a second channel with the second application;

instructing the first application to deactivate audio transmission;

instructing the amplifier to switch a speaker input from a first channel associated with the first application to the second channel after instructing the first application to deactivate audio transmission;

instructing the second application to activate audio transmission; and unmuting the audio output from the speaker, in response to confirming that the second application is transmitting audio data.

10. The method of claim 9, wherein the muting the audio output from the speaker includes at least one of suppressing audio transmission from the first application, suppressing audio transmission to the amplifier, or instructing the amplifier to set a speaker volume to zero.

11. The method of claim 9, wherein the instructing the first application to deactivate audio transmission is performed after the instructing the amplifier to associate the second channel with the second application.

12. The method of claim 9, wherein the first application and the second application are any combination of flutter applications and non-flutter applications.

13. The method of claim 9, wherein the amplifier receives instructions and audio transmissions through a digital interface.

14. A device comprising:

a controller including circuitry configured to perform operations including:

receiving, while a speaker outputs audio from a first application, an instruction to output audio from a second application;

muting audio output from the speaker in response to receiving the instruction;

instructing an amplifier in communication with the speaker to associate a second channel with the second application;

instructing the first application to deactivate audio transmission;

instructing the amplifier to switch a speaker input from a first channel associated with the first application to the second channel after instructing the first application to deactivate audio transmission;

instructing the second application to activate audio transmission; and unmuting the audio output from the speaker, in response to confirming that the second application is transmitting audio data.

15. The device of claim 14, wherein the muting the audio output from the speaker includes at least one of suppressing audio transmission from the first application, suppressing audio transmission to the amplifier, or instructing the amplifier to set a speaker volume to zero.

16. The device of claim 14, wherein the instructing the first application to deactivate audio transmission is performed after the instructing the amplifier to associate the second channel with the second application.

17. The device of claim 14, wherein the amplifier is configured to receive instructions and audio transmissions through a digital interface.

* * * * *